UNITED STATES PATENT OFFICE.

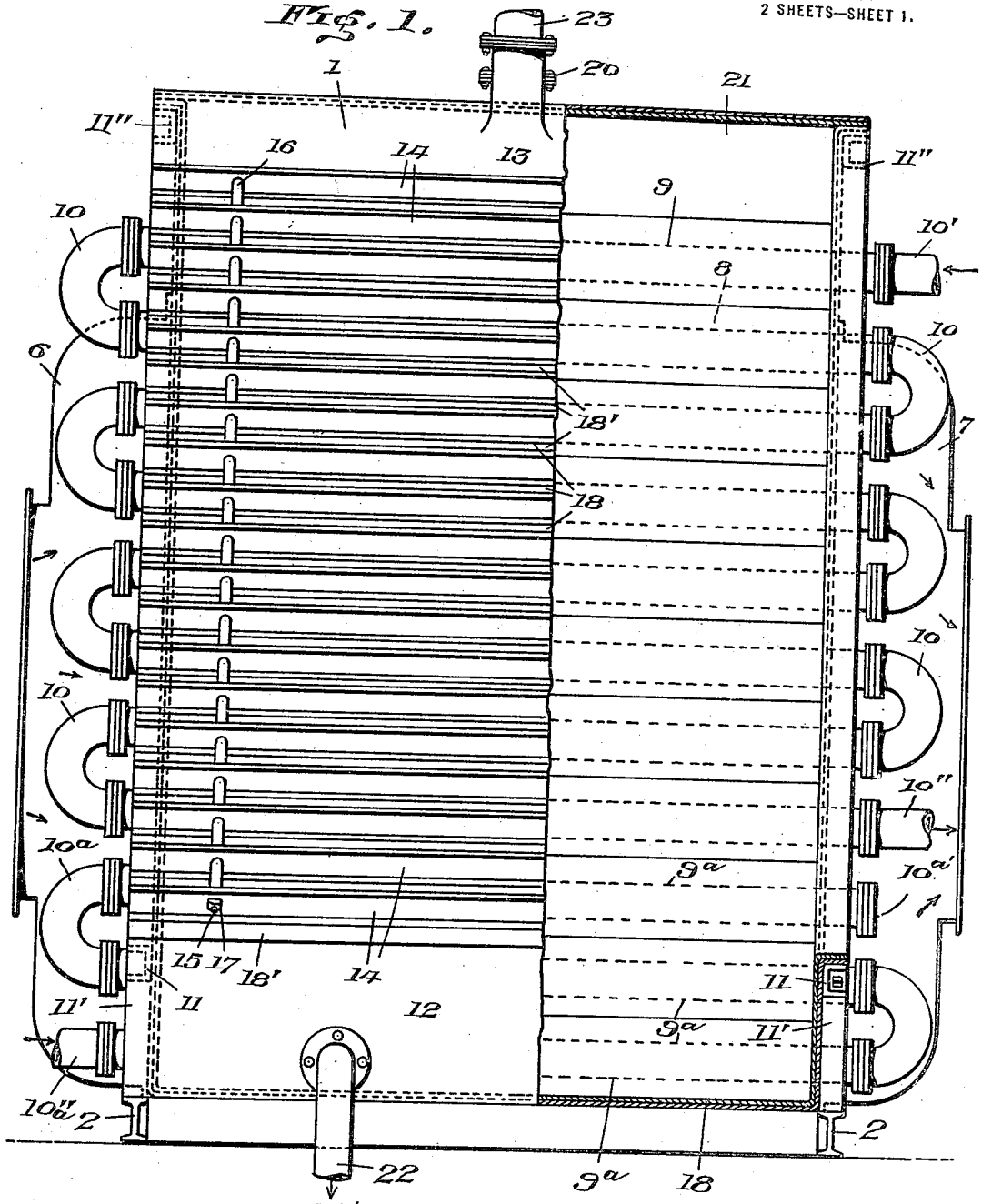

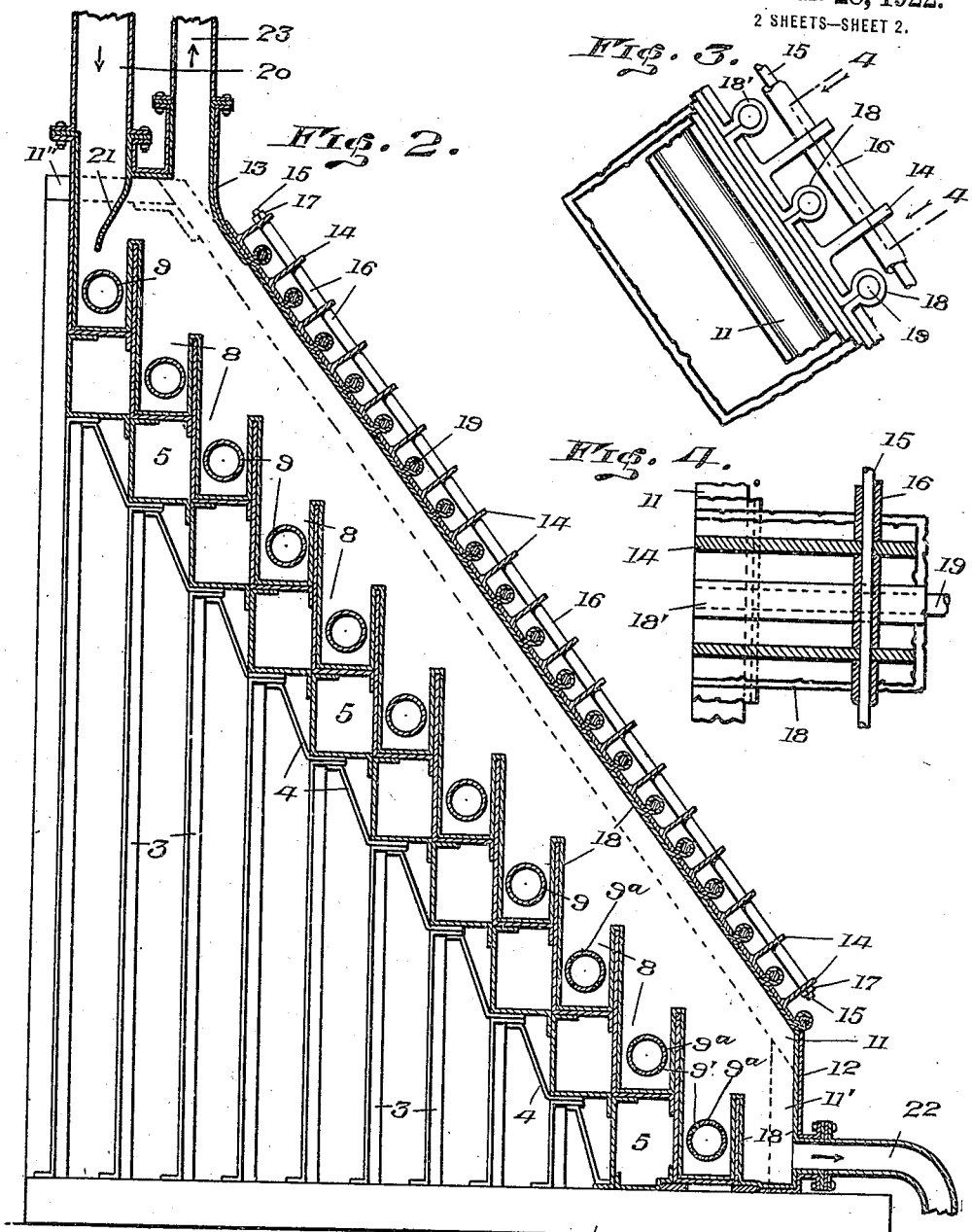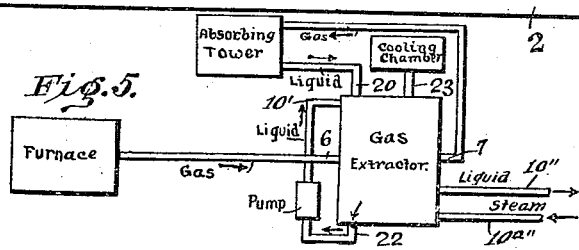

WALTER L. REMICK, OF ELIZABETH, NEW JERSEY.

GAS EXTRACTOR.

1,410,599.     Specification of Letters Patent.     Patented Mar. 28, 1922.

Application filed April 30, 1919. Serial No. 293,830.

*To all whom it may concern:*

Be it known that I, WALTER L. REMICK, a citizen of the United States, residing at Elizabeth, in the county of Union and State of New Jersey, have invented certain new and useful Improvements in Gas Extractors, of which the following is a specification.

My invention consists in a new and useful improvement in gas extractors, and is designed for the purpose of extracting and purifying gases produced in smelter furnaces or sulphur burners, and is more particularly adapted for the extraction of sulphur dioxide gas. My device secures the extraction of the gas from the solution in which it has become absorbed for the purpose of purification, by means of heat, which is applied to the solution by the novel structure and operation of my device. The success of the operation of the extraction of the gas depends upon the rapid, thorough and intense heating of the solution, to a temperature causing the discharge of the gas. My device provides means of heat exchange, wherein the high temperature, provided by the gas produced by the smelter furnaces, is conserved and applied for the purpose of superheating the solution absorbing the gas. My device utilizes the heat efficiency of the solution from which the gas has been extracted, as an heat agent auxiliary to the heated gas, for the purpose of heating the impregnated solution. Also provides means for injection of live steam for further heating and extraction.

My device is provided with a complete lining composed of lead to protect the device from the effect of the gas. To provide a cover lined with lead, my device is supplied with a novel form of suspension roof, so that there are no supports for the roof from within the device to contact with the lead lining. This device forms a resistance to pressure or vacuum that is not found in the ordinary roof suspension.

In the drawings:

Figure 1 is front perspective view of the device, partly broken away.

Figure 2 is a side sectional view of the device.

Figure 3 is an enlarged side perspective view of a detail.

Figure 4 is a top plan view, partly in section, on the line 4—4 of Figure 3.
Figure 5 is a diagram showing the arrangement of all the parts of the gas treating apparatus.

In the drawings:

The numeral 1 designates a gas-containing chamber mounted on the base rails 2 by means of the supporting columns 3 held in place by the angle braces 4. Between the chamber 1 and these supporting columns 3 is a series of parallelly disposed gradiently located gas flues 5, provided with an intake manifold 6 and an exhaust manifold 7. In the bottom of the chamber 1, immediately on top of the flues 5 is a series of troughs 8 gradiently disposed, in such form that the upper edge of the trough in each descending step is at the level of the bottom of the trough of the step above it. This arrangement of the troughs 8 is such that each of the flues 5 is located immediately alongside of the trough 8 in the next step below. Situated in these troughs 8 are pipes 9 so connected by U-pipes 10 as to form a sinuous fluid conduit throughout the larger portion of the series of troughs 8. The ends of the pipes 9 project through the walls of the chamber 1 and each pipe is connected to the one next to it by the U pipe 10. One end of the topmost pipe 9 is connected to the supply pipe 10′ and a discharge pipe 10″ is connected to one of the lower pipes 9. Situated in the remaining troughs 8 at the lower part of the series are the pipes 9ª so connected by U-pipes 10ª as to form a sinuous conduit throughout the remaining troughs 8. These pipes 9ª are provided with the perforations 9′. The second conduit enters the chamber 1 at its end 10ª″ and is blanked off at its opposite end 10ª′. At each end of the chamber 1, inclined at an angle of about 45° to the base rails 2, there is located a support beam 11, mounted on an upright beam 11′ located at the front edge of the chamber 1, and held in position at its upper end by the beam 11″. The chamber 1 is provided with a steel outer casing 12, which covers the ends of the troughs 8, extending up to and covering the upper edges of the support beams 11, and providing a cover for the front of the chamber 1, from the line of the base rails 2 to the lower ends of the support rails 11. The chamber 1 is provided with a top steel casing 13, which extends from the back of the top trough 8, forward to cover the chamber 1 to a point above the upper ends of the support rails 11. Stretching between and resting upon the support rails 11, is a series of T-rails 14, through which pass, at points adjacent the line of the support rails 11, tie rods 15, provided with spacing collars 16, and lock nuts 17 upon their ends. The chamber 1 is provided throughout with a lead lining 18, which is applied to the troughs 8, the casing 12 and the casing 13. This lead lining 18 passes under the faces of the T-rails 14, and is formed in a cylindrical flute 18' between each T-rail 14, in which flutes 18' are located the cross-rods 19. This formation of the lining 18 together with the T-rails 14 constitutes a cover for the chamber 1, extending between the support rails 11, and from the steel top casing 13 to that portion of the steel outer casing 12 which is situated between the lower ends of the support rails 11. In the top casing 13, there is located the inlet pipe 20 disposed directly above the top trough 8, and at its inner end provided with the reduced portion 21, extending downwardly into the top trough 8, adapted to direct the fluid, introduced into the chamber 1 through the inlet pipe 20, into the top trough 8 and to act as a gas trap. In the front of the chamber 1, at its bottom edge adjacent the base rails 2, there is located the discharge pipe 22. Situated directly in front of the inlet pipe 20, in the top casing 13, is the exhaust pipe 23.

Operation.

My device is designed to operate in conjunction with several well-known devices in common use in the process of handling gases in smelters or other sources of gas. The gas is supplied through a proper conduit from the furnaces to the intake manifold 6 of the device, by which it is distributed through the flues 5, and discharged through the exhaust manifold 7, whence it is piped to an absorbing tower, of any ordinary type, where it is mixed with water. This gas-impregnated solution is then conveyed from the absorbing tower through a pipe, to the inlet pipe 20 of the device. From the reduced portion 21, of the pipe 20, the solution flows into the top trough 8. When this trough has become full, the solution flows over the front edge of this trough 8 into the next lower trough 8, the process being continued until all the troughs 8 are filled and the overflow from the lowest trough 8 flows out of the device through the discharge pipe 22. From this pipe 22, the liquid is conveyed to the end 10' of the sinuous fluid conduit formed by the pipes 9 and 10. The liquid flowing through this conduit, passes through the pipes 9 located in the middle of the troughs 8, is discharged at its end 10".

The passage of the gas from the furnaces through the flues 5 causes a high temperature in these flues 5 and consequently a high temperature in the troughs 8, located directly above and alongside the flues 5. The effect of this is to cause excessive heat in the solution passing through the troughs 8. This heating of the solution causes the discharge of the gas in the solution, which rises above the troughs 8 up to the slanting cover of the device, located between the support rails 11, and escapes from the top of the device through the exhaust pipe 23, by means of which the gas is conveyed to a cooling chamber. The water used to cool the gas in the cooling chamber is permitted to flow through the exhaust pipe 23 into the device, where it is precipitated into the troughs 8, being commingled with the solution therein. The circulation of the spent liquid from the discharge pipe 22, through the sinuous conduit in the troughs 8, provides an additional heating agent in the device. Through the conduit formed of the pipes $9^a$ and $10^a$, steam is introduced and is forced to escape through the perforations 9' and is thus injected into the liquid in the troughs 8 through which pass the pipes $9^a$, thereby raising the gas-impregnated liquid to the required temperature for the complete extraction of the gas.

From the foregoing description of the operation of my device, it will be seen that impure gas supplied from the furnace may be properly washed in solution, and then extracted by the application of heating agents to the solution in my device, and discharged in purified form to be cooled.

Having described my invention, what I claim is:

1. The combination in a gas extractor of a chamber; means within said chamber for circulating a gas-impregnated liquid therein; heating means outside of said chamber adapted to heat said liquid in said circulating means; heating means adapted to introduce a fluid heating agent into said liquid in said circulating means; and heating means for conducting the heated liquid discharged from said chamber through said liquid within said chamber, all of said heating means adapted to cause the discharge of the gas from the liquid within the chamber.

2. The combination in an extractor of a gas-sealed chamber adapted to receive therein a gas-impregnated liquid; means outside of said chamber adapted to convey a heating agent in contact with the exterior of said chamber; means adapted to conduct the liquid through the chamber; means adapted to introduce a heating agent into said liquid within the chamber; and means located within said conducting means and adapted to circulate said heated liquid therein, after the gas has been discharged from said liquid.

3. The combination in a gas extractor of a chamber; a series of gradiently disposed open-top troughs; an intake pipe adapted to introduce liquid into the top trough of the series; a discharge pipe adapted to conduct liquid from the bottom trough of the series; and a series of heating flues disposed beneath the series of troughs and adapted to conduct hot gases in proximity to said troughs.

4. The combination in a gas extractor of a chamber; a series of gradiently disposed open-top troughs; an intake pipe adapted to introduce liquid into the top trough of the series; a discharge pipe adapted to conduct liquid from the bottom trough of the series; and a series of flues adapted to conduct a heating agent in proximity to said troughs, each flue being disposed beneath one trough and alongside another trough.

5. In a device for heating liquids, the combination of a series of gradiently disposed liquid receptacles; and a series of heat conducting means, each heat conducting means being disposed beneath one receptacle and alongside another receptacle.

6. In a device for heating liquids, the combination of a series of liquid receptacles; a series of flues adapted to conduct a heating agent in proximity to said receptacles; an intake manifold adapted to supply said heating agent to said flues; and an exhaust manifold adapted to exhaust said heating agent from said flues.

7. The combination in a gas extractor of a chamber; a series of gradiently disposed open-top troughs; an intake pipe adapted to introduce liquid into the top trough of the series; a discharge pipe adapted to conduct the liquid from the bottom trough of the series; a series of heating flues disposed beneath the series of troughs and adapted to conduct hot gases in proximity to said troughs; a sinuous steam conduit located in several of the troughs in the lower part of the series and provided with steam vents in said troughs adapted to supply steam to the liquid in said troughs; and a sinuous liquid conduit connected with the discharge pipe of the chamber and located in the remaining troughs adapted to conduct the discharged liquid through the liquid circulating through the troughs.

8. The combination in a gas extractor of a chamber; a series of rails upon the top of said chamber; and a cover lining suspended from said rails.

9. The combination in a gas extractor of a chamber; a series of rails mounted upon the top of said chamber; rods interposed between said rails; and a cover lining threaded between said rails and rods.

10. The combination in a gas extractor of a chamber; means located within said chamber adapted to cause the discharge of gas from gas-impregnated liquid in said chamber; two support rods disposed at an angle of approximately 45° to the vertical and mounted upon the edge of the top and the edge of the bottom of said chamber; a series of parallelly disposed transverse T-rails hung upon said support rods; and a cover lining suspended from said T-rails by cylindrical flues containing locking rods interposed between said T-rails.

In testimony whereof I affix my signature in the presence of two witnesses.

WALTER L. REMICK.

Witnesses:
  SIDNEY ROLLE,
  EDITH O. ROBERTSON.